United States Patent Office 3,282,914
Patented Nov. 1, 1966

3,282,914
3-AZO-ESTRANE-COMPOUNDS
Erich Hecker, Munich, Germany, assignor to Schering Aktiengesellschaft, Berlin, Germany
No Drawing. Filed Jan. 8, 1963, Ser. No. 250,022
Claims priority, application Germany, Apr. 22, 1959, Sch 25,922
3 Claims. (Cl. 260—192)

This application is a continuation-in-part of my co-pending application Serial No. 22,412, filed April 15, 1960 and now U.S. patent No. 3,086,028, for "3-Amino Estranes," and the claims of this application are directed to the subject matter of the invention which was not elected after a requirement of restriction in said application Serial No. 22,412.

The present invention relates to new estrane compounds, and more particularly to 3-azo-estrane compounds, to the production thereof, and to the use thereof in the production of valuable 3-amino estrane compounds.

It has not been possible prior to the present invention to produce amino compounds of the estrane series with an aromatic amino group, that is with an amino group which is joined to a carbon atom of an aromatic ring of the compounds of the estrane series. No derivatives of estradiol or estrones in which the 3-position phenolic hydroxyl group is substitued by an amino group have been able to be produced prior to the present invention.

It is thus a primary object of the present invention to provide for the production of such compounds, and in this connection the present invention has as its object a new series of 3-azo-estrane compounds which are useful as azo dyestuffs and in addition are useful as intermediates in the production of the compounds of the estrane series wherein the 3-position phenolic hydroxyl group of an estradiol or estrone-like compounds is substituted by an amino group.

It is yet another object of the present invention to provide compounds of the estrane series with an azo group linked to the 3-position.

It is yet another object of the present invention to provide for the production of compounds of the estrane series with an azo group linked to the 3-position.

Other objects and advantages of the present invention will be apparent from a further reading of the specification and of the appended claims.

With the above and other objects in view, the present invention mainly comprises an azo compound of the formula:

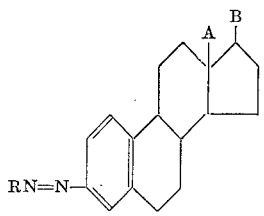

wherein R is selected from the group consisting of 2,4-dinitrophenyl, phenyl and H₂N.CO—, wherein A is selected from the group consisting of hydrogen and methyl, and wherein B is selected from the group consisting of =O, —OH and

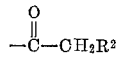

wherein $R^2$ is selected from the group consisting of hydrogen, OH, Oalk wherein alk is a lower alkyl, and Oacyl wherein acyl is derived from a lower aliphatic cerboxylic acid.

As shall be more fully described below, the above azo compounds may be reductively split, for example, by hydrogenation, to form the corresponding 3-amino compound of the formula:

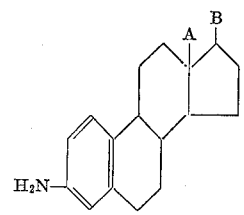

wherein A is selected from the group consisting of hydrogen and methyl, and wherein B is selected from the group consisting of =O, —OH and

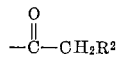

wherein $R^2$ is selected from the group consisting of hydrogen, OH, Oalk wherein alk is a lower alkyl, and Oacyl wherein acyl is derived from a lower aliphatic carboxylic acid.

It has been found in accordance with the present invention that the above set forth compounds can be produced by reacting a hydrazine derivative with a quinole of the estrane series, that is a compound having the following general formula:

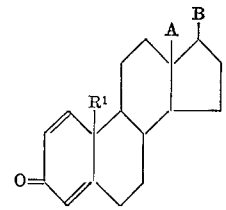

wherein A and B have the same definitions as above, and wherein $R^1$ is either hydroxyl, Oacyl, particularly a lower acyl, and most particularly acetyl, or fluorine. The quinoles of the estrane series wherein $R^1$ is hydroxyl or Oacyl may be easily obtained according to the method of German Patent No. 1,051,802, or according to the method of Gould and Schwenk in the Journal of the American Chemical Society, vol. 80, page 5683 (1958). The quinoles wherein $R^1$ is fluorine can be obtained by the oxidation of p-alkyl-phenolic steroids of the formula:

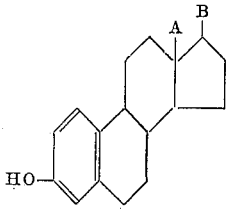

with perchlorylfluoride [note J. S. Mills, Journal of the American Chemical Society, 81, 5515 (1959)]. The obtained 10β-fluorodienone of the formula:

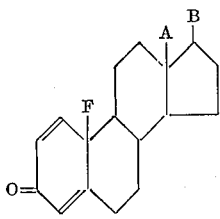

can then be reacted with a hydrazine derivative to yield the corresponding azo dyestuff.

The reaction of a quinole of the estrane series of the above type with a hydrazine derivative such as 2,4-dinitrophenylhydrazine, phenylhydrazine or semicarbazine results in reaction with the keto group in the 3-position (when $R^1$ is hydroxyl or Oacyl or when $R^1$ is F) to form the corresponding azo dyestuff. This reaction proceeds as follows:

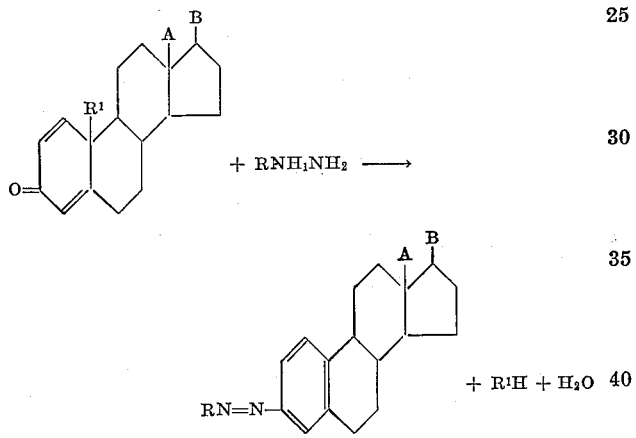

The resulting azo dyestuff may then be reductively split for example by hydrogenation to form the 3-amino-compound. This reaction proceeds in accordance with the following equation:

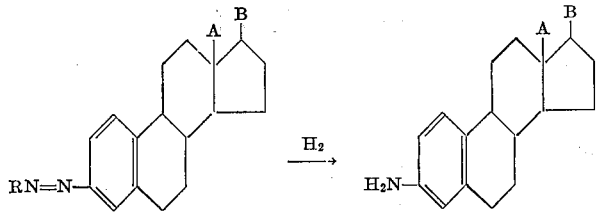

The reaction of the quinole with the hydrazine compound may be catalyzed by an acid. This reaction is preferably carried out in a suitable organic solvent of the usual type.

The reductive splitting of the azo dyestuff is suitably carried out with a reducing agent such as a dithionite, particularly sodium dithionite, or by catalytic hydrogenation in the presence of a catalyst such as a nickel catalyst, particularly Raney nickel, in a suitable organic solvent.

The azo compounds produced according to the present invention are actually azo dyestuffs and additionally serve as valuable intermediates in the production of new steroid compounds. The new amines of the present invention have an estrogen action and also are additionally very valuable as starting materials for the production of other valuable steroid compounds.

The following examples are given to further illustrate the present invention. The scope of the invention is not, however, meant to be limited to the specific details of the examples.

EXAMPLE 1

(a)(1) 0.5 millimol of 17β-acetoxy-estra-p-quinole having a melting point of 176–178° C. or its 10ξ-acetate having a melting point of 215–217° C. is dissolved in 10 cc. of glacial acetic acid and reacted with 10 cc. of DNPH reagent (saturated solution of 2,4-dinitrophenylhydrazine in glycolmonomethylether: 20 mg./cc.). The azo dyestuff separates in 24 hours in a more or less quantitative degree. The dry residue which is obtained from the mother liquor gives an additional small yield which is obtained by chromatography over aluminum oxide. The obtained azo compound which is 3-(2,4-dinitrophenyl)-azo-17β-acetoxy-$\Delta^{1,3,5(10)}$-estratriene melts at 212–213° C. (from glycolmonomethylether+acetone). The empirical formula is $C_{26}H_{28}N_4O_6$.

(2) 0.5 millimol of 17β-acetoxy-estra-p-quinole-acetate-(10ξ) is dissolved in 10 cc. of DNPH reagent and 1 millimol of p-toluene sulfonic acid dissolved in 1 cc. of methanol are added thereto. After 2 hours the separation of the azo dyestuff commences and after 24 hours the azo dyestuff is filtered off under suction. The mother liquor after dilution with water is shaken with chloroform. The chloroform solution is separated and upon evaporation of the chloroform the remaining dry residue is subjected to chromatography over aluminum oxide to obtain the remainder of the yield. The melting point of the obtained compound is 212–213° C.

(b)(1) 0.5 millimol of the azo dyestuff produced according to (a)(1) or (2) is dissolved in glycolmonomethylether at a temperature of about 80° C. 4 cc. of a freshly produced saturated solution of sodium dithionite in water are added to the warm solution and then 4 cc. of 2 normal sodium carbonate solution are added thereto. The solution at first turns red and in a few minutes becomes colorless. The reaction mixture is maintained at a temperature of 80° C. for about 20 minutes. After cooling the reaction mixture is worked up with ether. The dry residue obtained from the ether solution is subjected to chromatography over aluminum oxide. The yield is 70–80% of the theoretical of pure 3-amino-17β-acetoxy-$\Delta^{1,3,5(10)}$-estratriene having a melting point of 182–183° C. (from methanol+carbon tetrachloride).

(2) 1 millimol of the azo dyestuff obtained according to (a) above is dissolved in 40 cc. of tetrahydrofurane and with the addition of 4 g. of Raney nickel moistened with water hydrogenated at normal pressure. The take-up of hydrogen is completed in about 1½ hours and the solution is colorless. The reaction mixture is filtered to separate the catalyst and then taken up in methylenechloride, washed with water and dried over sodium sulfate. The dry residue is subjected to chromatoghaphy over aluminum oxide. The yield of pure 3-amino-17β-actoxy-$\Delta^{1,3,5(10)}$-estratriene having a melting point of 182–183° C. is approximately 80% of the theoretical. The empirical formula is $C_{20}H_{27}O_2N$.

EXAMPLE 2

In an analgous manner to that described in Example 1 starting from 17β-hydroxy-estra-p-quinole having a melting point of 218–221° C. or from its 10ξ-acetate having a melting point of 181–183° C. by first producing the coresponding azo dyestuff 3-(2,4-dinitrophenyl)-azo-17β-hydroxy-$\Delta^{1,3,5(10)}$-estratriene having the empirical formula $C_{24}H_{26}N_4O_5$, the desired 3-amino-17β-hydroxy-$\Delta^{1,3,5(10)}$-estratriene having a melting point of 138–139° C. (from methanol) is produced. The empirical formula of this compound is $C_{18}H_{25}ON$.

EXAMPLE 3

The production of 2,4-dinitrophenylhydrazone of 2,4-dinitrobenzene-[1-azo-3]-$\Delta^{1,3,5(10)}$-estratrienone-(17) of the formula:

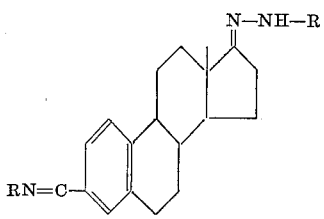

wherein R is 2,4-dinitrophenyl.

1 mmol of 17-oxo-estra-p-quinol-(10β) of the formula:

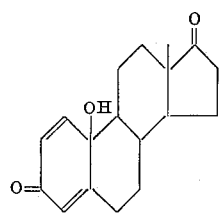

(or its 10β-acetate) are dissolved in 40 cc. of glacial acetic acid and heated to 50° C. The solution is mixed with a solution of 2,4-dinitrophenylhydrazine warmed to 50° C., and after several days of standing the reddish brown powder is filtered off under suction. The yield is 602 mg. (96% of the theoretical), the crude compound melting at 259–260° C. (with decomposition). After recrystallization from benzene/nitromethane (1:1) there is obtained 505 mg. melting at 269–270° C. (with decomposition).

$C_{30}H_{28}N_8O_8$ (628.6) calc.: C, 57.32; H, 4.49; N, 17.83. Found: C, 57.26; H, 4.30; N, 17.69.

$\lambda_{max}$ 225–227, 362–363 mμ, $\epsilon_{max}$ 44,600, 59,500 (in tetrahydrofurane); IR: $\nu_{NH}$ 2.99, $\nu_{C=N}$ 6.15, $\nu_{NO_2}$ 6.5, 7.45μ.

The diacetate of 3,17β-diamino-$\Delta^{1,3,5(10)}$-estratriene of the formula:

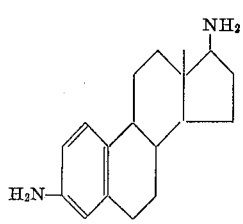

and the acetate of 3-amino-$\Delta^{1,3,5(10)}$-estratrienone-(17) of the formula:

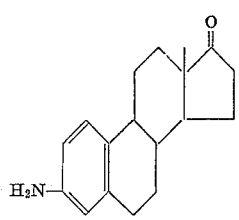

are produced as follows:

0.5 mmol of 2,4-dinitrophenylhydrazone of 2,4-dinitrobenzene - [1 - azo - 3]-$\Delta^{1,3,5(10)}$-estratrienone - (17) is suspended in 20 cc. of tetrahydrofurane and 20 cc. of methanol and shaken with 4 g. of Raney nickel at 45° C. until cessation of hydrogen take-up. 2 g. of catalyst are then again added thereto and shaken for an additional 2 hours. The completely colorless solution is filtered free of the catalyst, brought to dryness, and worked up as described above.

The dry residue is allowed to stand overnight with 5 cc. of acetanhydride, then warmed for 1 hour at 60–70° C., and after removal of the acetanhydride subjected to chromatography on anionotrop alumina, Act.-St. IV, 1.5 x 100 cm. It is then taken up in the smallest possible amount of chloroform or dimethylformamide and eluated with benzene/chloroform (1:1) at fraction 34 with chloroform. Fractions of 20 cc. each are collected.

| Fraction No. | Substance |
| --- | --- |
| 1–11 | |
| 12–13 | 11 mg. of the acetate of 3-amino-$\Delta^{1,3,5(10)}$-estratrienone-(17) |
| 14–18 | |
| 19–38 | 69 mg. of the diacetate of 3,17β-diamino-$\Delta^{1,3,5(10)}$-estratriene |
| 39–43 | |

The substance from the fractions 12 and 13 melts after recrystallization from methanol at 229–232° C. Corresponding bands from the chromatography of several charges are purified, after repeated chromatography on anionotrop alumina, Act.-St. IV, 1 x 100 cm. under high vacuum of 0.01 to 0.02 mm. Hg and 180° C. bath temperature sublimated and the sublimate recrystallized from 0.5 cc. of methanol, the compound melting at 233–235° C. The substance is, after this purification operation, still weakly colored red-brown and exhibits in UV a band at 335 mμ which can be traced back to the impurity. It disappears after recrystallization from chloroform, M.P. 241–242° C.

$C_{20}H_{25}NO_2$ (311.4) Calc.: N, 4.49. Found: N, 4.73.

$\lambda_{max}$ 247, 289 mμ, $\epsilon_{max}$ 15,050, 1130; IR: $\nu_{NH}$ 3.03, $\nu_{CO\ ketone}$ 5.75, $\nu_{CO\ amide\ I}$ 5.98, $\nu_{CO\ amide\ II}$ 6.52μ.

The substance obtained from the fractions 19–38 is difficultly soluble in most organic solvents such as benzene, chloroform, tetrahydrofurane, ethyl acetate, acetone and dioxane, and only slightly soluble in dimethylformamide. It can be recrystallized from a large amount of methanol, however only with loss. There is thus obtained colorless crystals melting at 321–323° C. $[\alpha]_D^{22}$: +2° (0.5% in dimethylformamide).

The compound persistently retains some methanol.

$C_{22}H_{30}N_2O_2$ (354.5) calc.: C, 74.54; H, 8.53; N, 9.03. Found: C, 74.77; H, 8.39; N, 9.14.

$\lambda_{max}$ 247, 289 mμ, $\epsilon_{max}$ 16,500, 1230; IR: $\nu_{NH}$ 3.01, 3.06, $\nu_{CO\ amide\ I}$ 6.00, 6.04, $\nu_{CO\ amide\ II}$ 6.50μ.

EXAMPLE 4

3 mmols of 3-hydroxy-17β-acetyl-$\Delta^{1,3,5(10)}$-estratriene of the formula:

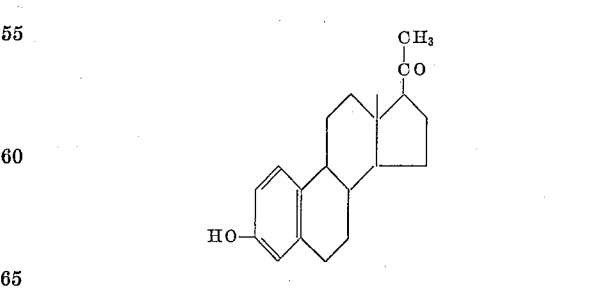

are suspended in 100 cc. of glacial acetic acid and under stirring mixed in small portions during a time period of 3 hours with 6 mmoles of lead tetraacetate. After the oxidation agent has been used up the glacial acetic acid is drawn off under vacuum and the remaining resin-like mass worked up with methylene chloride, sodium bicarbonate and water. The dry residue is subjected to chromatography with benzene on aluminum oxide (anionotrop, Act.-

St. IV). There is thus obtained 300 mg. (29% of the theoretical) of 17β-acetylestra-p-quinol-10β-acetate of the formula:

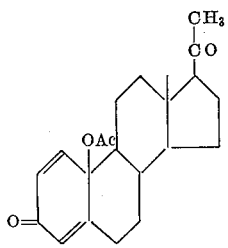

melting at 231–233° C.

$C_{22}H_{28}O_4$ (356.4) calc.: C, 74.13; H, 7.91; O, 17.96. Found: C, 73.96; H, 7.99; O, 17.87.

$\lambda_{max}$ 249 mμ, $\epsilon_{max}$ 12,850 (in ethanol); IR (in KBr): $\nu_{CO\ ester,\ ketone}$ 5.76, $\nu_{CO\ conj.}$ 5.99, $\nu_{CC\ conj.}$ 6.10, 6.21μ.

0.5 mol of the 17β-acetyl-estra-p-quinol-10β-acetate is dissolved in 15 cc. of glacial acetic acid and reacted with 10 cc. of 2,4-dinitrophenylhydrazine reagent (total solution of 2,4-dinitrophenylhydrazine in glycolmonomethylether, approximately 20 mg./cc.). The resulting azo compound, namely 2,4-dinitrophenylhydrazone of 2,4-dinitrobenzene-[1-azo-3]-17β-acetyl-$\Delta^{1,3,5(10)}$-estratriene of the formula:

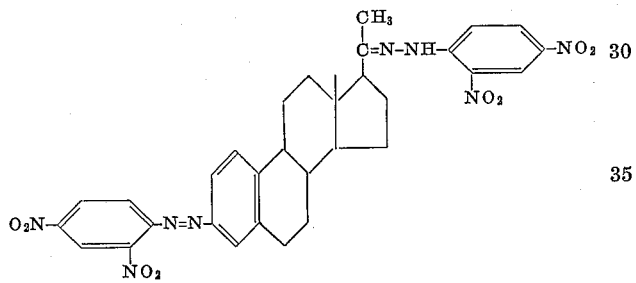

separates from the remainder practically quantitatively in about 24 hours. The crystalline powder is filtered off under suction and washed with methanol, and melts at 272–273° C.

$C_{32}H_{32}N_8O_8$ (656.6) calc.: C, 58.53; H, 4.91; N, 17.07; O, 19.49. Found: C, 58.39; H, 4.99; N, 16.98; O, 19.39.

$\lambda_{max}$ 226, 364mμ, $\epsilon_{max}$ 43,700, 58,900 (in tetrahydrofurane); IR (in KBr): $\nu_{NH}$ 3.00, $\nu_{C=N}$ 6.14, $\nu_{NO2}$ 6.49, 7.44μ.

Following the same procedure as set forth in Example 3, however substituting the corresponding 10β-fluoro compound for the 10β-hydroxyl or 10β-acetyl compound, the same azo compounds with the same melting points and degrees of purity, as well as the same yields are obtained.

The following table shows the different azo compounds of the present invention that can be produced in accordance with the method of the present invention from different starting materials:

Table

| Starting Material | Azo Compound |
| --- | --- |
| 3-hydroxy-17β-carbomethoxy-$\Delta^{1,3,5(10)}$-estratriene. | 2,dinitrobenzene-[1-azo-3]-17β-carbomethoxy-$\Delta^{1,3,5(10)}$-estratriene. |
| 3-hydroxy-17β-ethyl-$\Delta^{1,3,5(10)}$-estratriene | 2,4-dinitrobenzene-[1-azo-3]-17β-ethyl-$\Delta^{1,3,5(10)}$-estratriene. |
| Estriol-16,17-diacetate | 2,4-dinitrobenzene-[1-azo-3]-16α,17β-diacetoxy-$\Delta^{1,3,5(10)}$-estratriene. |
| Estrolic acid lactone | 2,4-dinitrobenzene-[1-azo-3]-D-homo-17α-oxa-estra-1,3,5(10)-triene-17-one. |
| Doisynolic acid-dimethylester | 2,4-dinitrobenzene-[1-azo-3]-16,17-seco-estra-1,3,5(10)-triene-16-methyl,17-oinic acid-dimethylester. |
| Marrianolic acid-dimethylester | 2,4-dinitrobenzene-[1-azo-3]-16,17-seco-estra-1,3,5(10)-triene-16′,17-dioinic acid methyl ester. |
| 6-keto-estradiol-17β-monoacetate | 2,4-dinitrophenylhydrazone of 2,4-dinitrobenzene-[1-azo-3]-6-keto-estradiol-17β-acetate. |
| 6,7-dehydroestrone | 2,4-dinitrophenylhydrazone of 2,4-dinitrobenzene-[1-azo-3]$\Delta^{1,3,5(10)6,7}$-estratetraeneone-17. |
| 6,7-dehydroestradiol-17β-monoacetate. | 2,4-dinitrobenzene-[1-azo-3]$\Delta^{1,3,5(10)6,7}$-estratetraenol-17β-acetate. |
| 9,11-dehydroestrone | 2,4-dinitrophenylhydrazone of 2,4-dinitrobenzene-[1-azo-3]$\Delta^{1,3,5(10)9,11}$-estratetraene-one-17. |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. 3-(2,4-dinitrophenyl)-azo-17β-acetoxy - $\Delta^{1,3,5(10)}$-estratriene.
2. 2,4-dinitrophenylhydrazone of 2,4-dinitrobenzene-[1-azo-3]-$\Delta^{1,3,5(10)}$-estratrienone-(17).
3. 2,4-dinitrophenylhydrazone of 2,4-dinitrobenzene-[1-azo-3]-17β-acetyl-$\Delta^{1,3,5(10)}$-estratriene.

References Cited by the Examiner

UNITED STATES PATENTS 2,808,399  10/1957  Dodson _____ 260—192
2,928,823  3/1960  Senn _____ 260—192 XR

FOREIGN PATENTS 1,067,176  8/1959  Germany.

OTHER REFERENCES

Taylor et al.: Sidgwick's Organic Chemistry of Nitrogen, pp. 438–444.

CHARLES B. PARKER, *Primary Examiner.*

N. S. MILESTONE, F. D. HIGEL, *Assistant Examiners.*